United States Patent Office 3,368,967
Patented Feb. 13, 1968

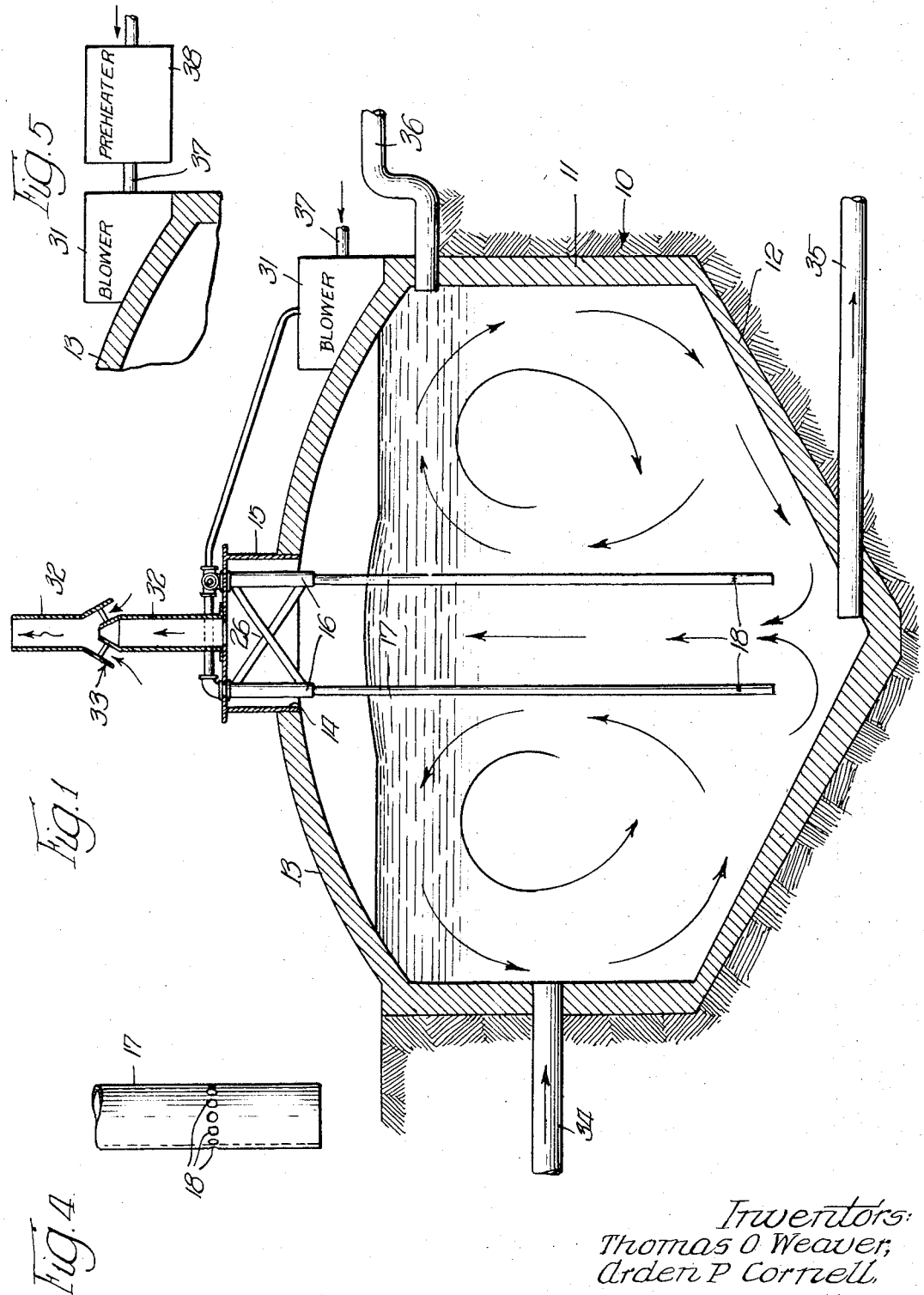

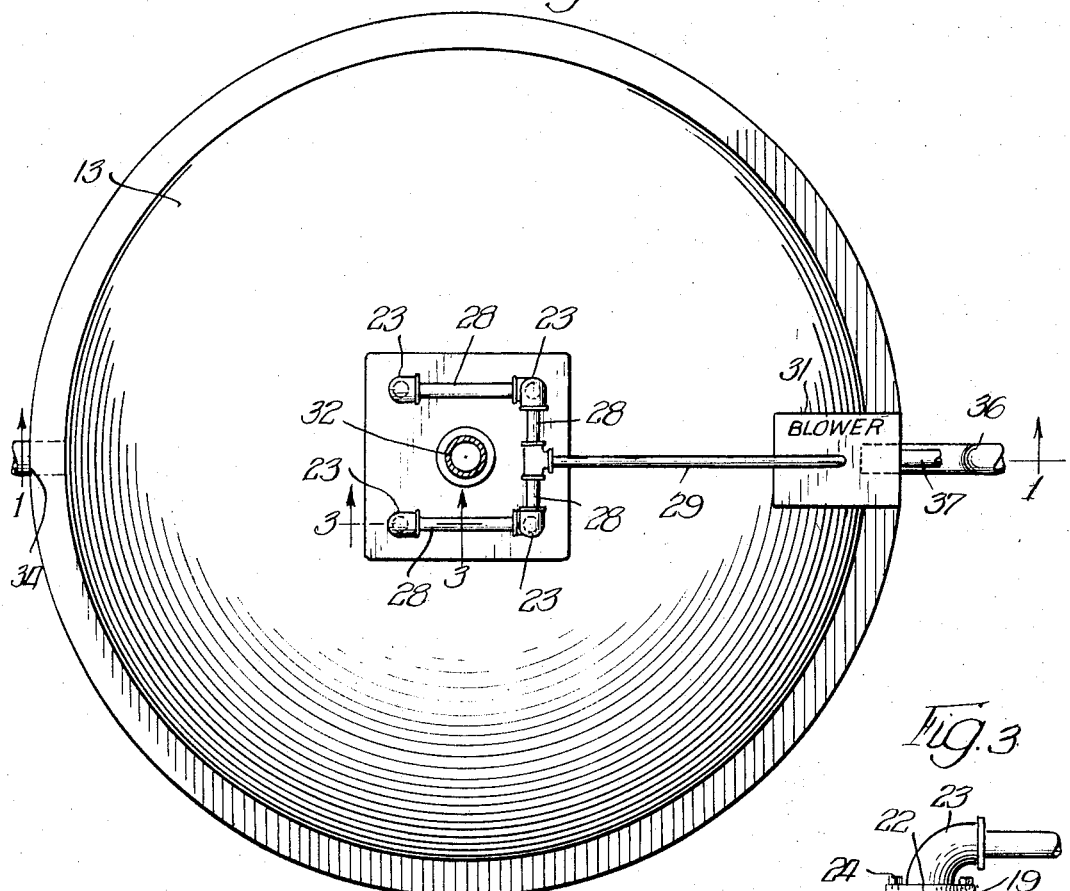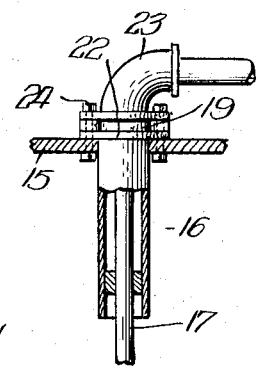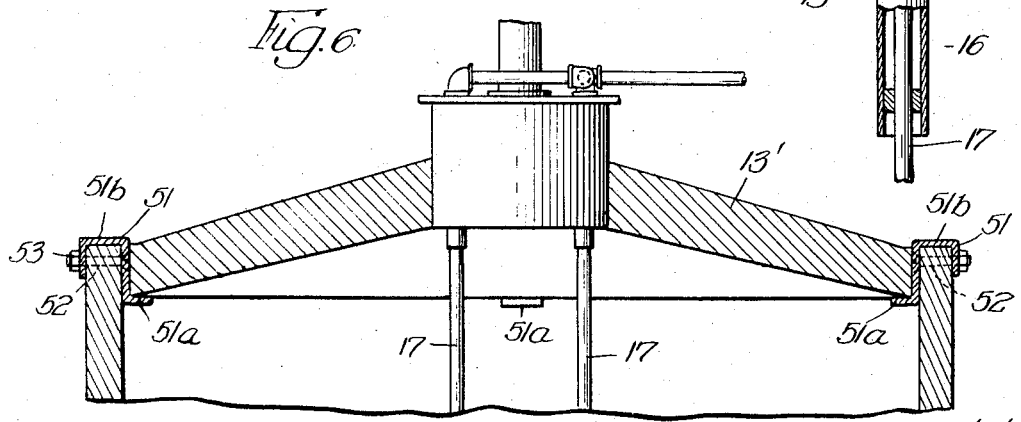

3,368,967
PROCESS FOR TREATMENT OF SLUDGE
AND APPARATUS THEREFOR
Thomas O. Weaver, Rochelle, and Arden P. Cornell, Genoa, Ill., assignors to Beloit Corporation, Beloit, Wis., a corporation of Wisconsin
Filed Oct. 19, 1965, Ser. No. 497,639
11 Claims. (Cl. 210—12)

ABSTRACT OF THE DISCLOSURE

The present invention is directed to a process and apparatus for treatment of sludge wherein compressed air is supplied to the bottom region of a vented thermal insulated treatment vessel containing sludge, the temperature of the sludge is maintained within a range of from about 70° F. to about 140° F. and the supply of compressed air is controlled so that the compressed air is contained in the vessel in quantities sufficient to suppress anaerobic digestion and the production of methane gas but insufficient to support aerobic digestion. In one embodiment heat conductor tubes are submerged in the sludge and compressed air is passed through the tubes. As it travels to the bottom of the vessel, the heat from the compressed air is transferred through the tubes to the sludge.

---

This invention relates to the treatment of sewage and, in particular, to a novel process for the treatment of separated sludges, scums, fats, greases, and other solid organic materials. This invention also relates to apparatus for the attainment of this process.

As used herein, "treatment" of sludges refers to reduction of the gross volume of the sludge by the conversion of putrescible or volatile pollute into more stable forms of liquids, gases, vapors, and relatively stable solids which can be disposed of without causing odor nuisances or health hazards.

Historically in the prior art, separated sludges and concentrated solid pollutes have been treated either by aerobic or anaerobic processes of single or multiple stages. In some instances, the treatment has involved a stage of aerobic digestion followed by a stage of anaerobic digestion or vice versa.

The anaerobic process is carried out in enclosed, insulated vessels and kept free from contact with atmospheric oxygen, as oxygen added to anaerobic gas products in the enclosed vessels creates an explosive mixture. Moreover, the presence of molecular or dissolved oxygen in the substrate has been found to be toxic to the obligate anaerobes or "gasification bacteria." The principal disadvantages to the anaerobic process have historically been high initial cost, a necessity for a relatively high degree of competent superintendence, and extended time required for adequate treatment. The time required for treatment has been hastened with minimum operating cost by utilizing the gas products of the process for heating the digestor. Other refinements have been made in the anaerobic process, but the problems referred to above remain in substantial degree.

The aerobic process makes use of a different type of bacteria. The aerobic bacteria thrive in the presence of positive concentrations of dissolved oxygen in the substrate. For accomplishment of the aerobic process, large quantities of oxygen must be provided or the substrate will "go septic," emitting noxious odors and not properly treating the pollute. Although, in relation to the anaerobic process, the aerobic process requires lower initial investment and a lesser degree of maintenance and superintendence, its operation costs can become quite high because of the power required to supply large quantities of air to the digestor.

Reference may also be made at this juncture to the process described in the Mallory Patent No. 2,430,519. Mallory teaches the addition of small amounts of compressed air intermittently or continuously to an anaerobic digestion process being carried out in an enclosed vessel. He reported that he was able to reduce digestion time by air mixing of the anaerobic sludges sufficient to stir them. He also reported in the patent that the small quantities of oxygen which he added to the anaerobic digestor did not disturb the anaerobic process. The Mallory process, however, involves the dangerous condition of mixing oxygen with the gas products of anaerobic digestion in an enclosed vessel.

Briefly described, the present invention comprises the supply of compressed air to a thermal-insulated but well-vented digestor vessel in quantities sufficient to suppress anaerobic digestion and prevent the production of appreciable or measurable quantities of methane gas but insufficient to support aerobic digestion. The compressed air is supplied through heat-conductive tubes to the bottom region of the digestor vessel. The amount of compressed air supplied is regulated to maintain a positive volatile acid concentration in the digestor but less in amount than 2000 parts per million while maintaining a sludge temperature in the range of 70° F. to 140° F.

It is a primary object of the present invention to provide a process and apparatus for sewage treatment characterized by low initial investment, minimum maintenance and superintendence requirements, and low operating power costs.

Another object of the present invention is to provide a sewage treatment process wherein compressed air is supplied to a thermal-insulated, well-vented digestor under regulated conditions which preclude the possibility of forming an explosive mixture of methane gas and oxygen.

It is another object of the present invention to provide a sewage treatment process which is useful not only in the day-to-day treatment of sewage but also in cleaning and restoring to normal operating condition anaerobic digestors which have been "killed" by a flood of toxic wastes or otherwise rendered inactive or inefficient by conditions within the digestor. For this purpose, the method and apparatus of the present invention is inexpensive and convenient.

It is still another object of the present invention to provide a process and apparatus for sewage treatment to which presently overloaded anaerobic digestors can readily be converted with minimum expense.

It is a further object of the present invention to provide a sewage treatment process and apparatus which is suitable for use in a multiple stage sewage treatment system.

An additional object of the present invention is to provide a sewage treatment process which is highly stable and adapted to accommodate "shock" loads without upsetting.

These and other objects and features of the present invention will be better understood by reference to the following detailed description and to the accompanying drawings.

In the drawings:

FIGURE 1 is a cross-sectional view of a separate sludge treatment digestor in accordance with the present invention.

FIGURE 2 is a top plan view of the digestor shown in FIGURE 1.

FIGURE 3 is an enlarged cross-sectional view taken along the line 3—3 in FIGURE 2.

FIGURE 4 is an enlarged fragmentary view showing the end portion of one of the heat-conductive tubes.

FIGURE 5 is a fragmentary illustration showing the addition of a preheater.

FIGURE 6 is a partial cross-sectional view illustrating the conversion of a floating cover type anaerobic digestor to the present invention.

Referring now to FIGURES 1 through 4, there is shown one form of digestor in accordance with the present invention. The digestor preferably comprises a treatment vessel 10 having a cylindrical side wall 11, a conical bottom portion 12, and a convexo-concave fixed cover 13. The treatment vessel 10 is preferably constructed of concrete rather than metal in order to possess a better thermal insulation characteristic and to prevent condensation of vapors on the underside of the cover 13. To further insure adequate thermal insulation of the treatment vessel 10, the major portion of the same is preferably embedded in the earth. It will be noted that the treatment vessel 10 resembles that of a conventional anaerobic digestor. Indeed, a conventional anaerobic treatment vessel may readily be used for this purpose.

The cover 13 is provided with a central opening 14 in which is suitably mounted a housing 15. A conventional gas dome of the type found in anaerobic digestors may readily be adapted as the housing 15. Mounted in the top of the housing 15 and extending through into the interior of the housing 15 are a plurality of iron pipes 16. In the apparatus shown, there are four such pipes 16. Extending from each of the iron pipes 16 downwardly to the bottom region of the treatment vessel 10 is heat-conductive aluminum pipe 17. An annular arrangement of air apertures 18 is provided in the bottom portion of each aluminum pipe 17, as best shown in FIGURE 4.

Referring to FIGURE 3, it is seen that the aluminum pipe 17 may be supported by providing a flange 19 at its upper end and securing the flange 19 between a flange 21 on the iron pipe 16 and a flange 22 on an iron elbow or other coupling 23. The flange 21 of the iron pipe 16 may be supported by the top panel of the housing 15 and the entire assembly secured by bolt-and-nut fasteners 24. The aluminum pipe 17 may be secured against sway by a collar 25 force fitted or otherwise secured within the lower portion of the iron pipe 16. The iron pipes 16, in turn, may be braced by suitable cross members 26, as shown in FIGURE 1.

As best shown in FIGURE 2, the aluminum tubes 17 communicate through the couplings 23 and insulated conduits 28 and 29 with a variable-volume, variable-pressure air blower 31, preferably of the cycloidal rotary positive displacement type. The conduits 28 and 29 may be insulated by wrapping the same with conventional pipe insulation.

Referring to FIGURE 1, it is seen that the treatment vessel 10 is ventilated from the housing 15 by a relatively large diameter exhaust stack 32. The exhaust stack 32 may be provided with a venturi inlet nozzle assembly 33 to mix the vented vapors with air at high velocities for maximum blending and mixing with air. The venturi inlet nozzle assembly 33 also enables the vented vapors to be mixed with ozone or other odor masking chemicals should this be found necessary because of the environment surrounding the particular digestor installation.

Sludge to be treated is introduced into the treatment vessel 10 via an inlet pipe 34, shown in FIGURE 1. The treated sludge is removed via a constant level pipe 36 in the upper portion of the treatment vessel 10. A pipe 35 may also be provided in the bottom portion of the treatment vessel 10 for draining the same when desired.

To treat the pollute introduced into the vessel 10, in accordance with the present invention, air is drawn into the inlet 37 of the blower 31, compressed, and forced through the nested aluminum pipes 17 into the bottom region of the vessel 10. The annular arranged apertures 18 are located a distance above the bottom ends of the pipes 17, and the bottom ends of the pipes 17 are left open so that, when air flow stops, sludge tends to flow into the pipes 17, through the bottom of the pipes 17 rather than through the small apertures 18 and, when the blower 31 is re-started, sludge tends to flow out of the bottom of the pipes 17 rather than through the apertures 18. This arrangement prevents plugging of the apertures 18. In operation, the air pressure must be sufficient to overcome the head of sludge above the apertures 18. With the blower 31 operating, the sludge level in the pipes 17 should preferably be approximately a foot below the apertures 18. Typically, the compressed air is discharged from the blower 31 at pressures of from 10 to 15 p.s.i.g. and at a temperature raised by substantially adiabatic compression to approximately 150° F. or higher over the ambient temperature. The aluminum tubes 17 serve as heat exchangers which conduct the heat provided by the high temperature compressed air to the sludge. The air is injected into the sludge at the bottom region of the vessel 10 through the apertures 18 to form a plurality of bubble streams which agitate the sludge, breaking up and masticating the solid material.

The compressed air is injected into the sludge in quantities sufficient to suppress obligate anaerobes by providing a high content of molecular oxygen in the sludge but insufficient to supply enough dissolved or molecular oxygen to support aerobic digestion. Typically, the quantity of compressed air supplied will be in the range of 20 cubic feet of air per minute per 1000 cubic feet of sludge volume within the digestor vessel 10, depending upon the sludge loadings, temperature of the sludge feed, and assuming intermittent operation of the blower 31 in many applications particularly in warmer ambient temperatures.

It is believed that the digestion process in the present invention is provided by facultative bacteria which have the facility to live in the presence or absence of dissolved oxygen and which effect separation of water from the solid pollutes and reduce or break down solid pollutes into volatile organic acids such as acetic, propionic, and butyric acids. Typically, the volatile acid concentration in the substrate will be in the range of 1000 p.p.m. These volatile acids, it is believed, are volatilized and driven out of the vent stack 32 by the action of the hot compressed air being forced through the treatment vessel 10. Other or further, presently unknown catalytic or organic reactions may be operating on the solid pollute in the present invention, but the foregoing explanation appears the most satisfactory at this time.

In practicing the present invention, it has been found that certain control parameters must be maintained within defined ranges. In particular, a positive volatile acid content, preferably in excess of 300 p.p.m., is maintained. The volatile acid concentration, however, should not exceed 1500 to 2000 p.p.m. since volatile acid concentrations above this range appear to impair the metabolism of the facultative bacteria. In addition, the temperature of the sludge in the treatment vessel 10 must be kept within the limits of 70° F. to 140° F. Outside of this temperature range, the facultative bacteria cannot effectively metabolize. A range of 70° F. to 110° F. is preferable, and for optimum results, a temperature range of from 90° F. to 100° F. should be maintained.

Control of the present process is attained by controlling the amount of compressed air supplied, since both the temperature and the volatile acid concentration in the treatment vessel 10 are functions of the quantity of compressed air injected via the nested tubes 17. The temperature in the treatment vessel 10 increases with an increase in the quantity of compressed air supplied while the volatile acid concentration decreases with an increase in the quantity of compressed air supplied. The volatile acid concentration and, hence, the quantity of compressed air necessary are also dependent upon the extent of loading of the digestor in pounds of volatile solids.

In practice, it has been found that the process is quite stable and can readily be controlled by relatively unskilled personnel. The operator need only maintain the temperature and volatile acid concentrations in their optimum regions by regulating the quantity of compressed air supplied to the treatment vessel 10. The process is particularly adapted to accommodating "shock" loads without upsetting. The compressed air may be supplied either intermittently or continuously, depending upon the particular needs. In very cold weather, it may be found beneficial to preheat the air in a suitable preheater 38, as illustrated in the fragmentary view of FIGURE 5, or to otherwise provide additional heat to the digestor. Preheating, however, should not otherwise be necessary.

The present process is well adapted for cooperation with anaerobic or aerobic digestors in a multiple stage sewage system. The input to the treatment vessel 10 may be in the form of sludge separated from raw waste, or secondary sludge from another treatment stage, or both. The effluent from the treatment vessel 10 may be further treated in an aerobic or anaerobic digestor or discharged to lagoons for polishing and decanting. The treatment will vary somewhat upon the distribution to be made of the effluent. It should be noted at this juncture that when feeding the effluent from the present process to an anaerobic digestor, the temperature of the effluent should preferably be maintained within the mesophilic range so as to readily adapt to anaerobic digestion.

By way of example, the present invention was satisfactorily practiced under the following conditions. For the treatment vessel 10, an existing insulated, fixed-cover, anaerobic digestor with a 35 foot diameter, 30 degree slope hopper bottom, and 20 foot side wall depth was used. The volume of this treatment vessel was 20,000 cubic feet. Four approximately 24 foot, four inch diameter aluminum pipes 17 were suspended from the previous gas dome 15 and manifolded to a blower 31 in the manner previously described. Annularly arranged air exit apertures 18 of approximately one half inch diameter were provided approximately 18 inches from the bottom ends of the pipes 17, and a vent stack 33 was mounted on the gas dome 15, all as previously described. A cycloidal type rotary positive displacement blower was used as the blower 31. It was found that approximately 20 to 30 brake horsepower was required to handle a digestor loading rate of approximately 3000 pounds of volatile solids per day with the blower 31 compressing the air to approximately 10 p.s.i.g. and furnishing the compressed air to the digestor at approximately 20 cubic feet per minute. It was also found that the optimum temperature range of 90° F. to 100° F. could adequately be maintained without preheating the air and that the volatile acid content could adequately be kept at 1000 p.p.m. or lower. A substrate pH of 7.0 or greater was regularly maintained. The sludge detention time for satisfactory treatment varied from a minimum of 10 days to a maximum of 15 days, depending upon the loadings and nature of disposal. It was found that the digestor would handle raw and waste activated pollute from approximately 30,000 population equivalent under the foregoing conditions. No appreciable quantities of methane gas were detected in the stack vapors from the digestor. Moreover, greases and fats were reduced more effectively than under aerobic digestion conditions. Although it could not be settled in as short sedimentation times as anaerobic digestor effluent, the effluent slurry from the subject digestor was of good quality and has been discharged to lagoons and sand beds with no offensive odor production.

It should be noted that the capability for handling the waste of 30,000 population equivalent in a 20,000 cubic foot treatment vessel is significant. This comprises a rate of ⅔ of a cubic foot per capita. Aerobic digestion normally requires two to three cubic feet per capita and anaerobic digestion normally requires four to six cubic feet per capita. Hence, the salient advantages of greatly reduced volume and reduced initial cost provided by the present invention are apparent. Moreover, the power requirement of 20 to 30 brake horsepower for treating wastes from 30,000 population equivalent will be readily recognized as very low by those skilled in the art. This power requirement is three to four times less than that of aerobic digestion.

As previously indicated, the present invention may be used efficiently but inexpensively to return to service anaerobic digestors which have geen "killed" or have ceased functioning efficiently for various reasons such as a "shock" load of toxic wastes, build-up of a scum cap in the digestor, overfeeding, inadvertent loss of digestor temperature, build-up of grit which has reduced the digestor capacity, etc.

To clean an inactive or inefficient anaerobic digestor, the same equipment previously described is installed in the digestor. However, to prevent an explosive mixture of air with methane, the digestor should be filled with water while the equipment is being installed. When the equipment has been installed, the cleaning may begin by dropping the water level to its normal level and immediately initiating the present process by injecting compressed air into the treatment vessel 10 via the aluminum tubes 17.

To adapt floating cover type anaerobic digestors for cleaning in accordance with the present invention, the cover 13' is floated close to the top of the side walls 11 by filling the digestor with water, and four or more hooks 51 are installed so as to suspend the cover 13' at a top elevation, as shown in FIGURE 6. The hooks 51 include a flange portion 51a for supporting the cover 13' and a U-shaped top portion 51b for engaging the top rim of the side walls 11. The hooks 51 are affixed to the top rim of the side wall 11 by bolts 52 passed through the side wall 11 and the U-shaped portion 51b and secured by nuts 53. As in the case of the fixed cover digestors, when the equipment is installed, the water level is lowered to slightly below the ceiling of the cover 13', and the cleaning is initiated by injecting air via the aluminum tubes 17.

With the blower 31 in operation, the process for cleaning the digestor proceeds in the same manner as for treating sludge, although the quantity of air supplied will generally be somewhat greater. For example, the quantity of compressed air required for cleaning may be expected to run approximately 25 cubic feet per minute per 1000 cubic feet of load in the digestor at a pressure of 10 to 15 p.s.i.g. During the cleaning process, the diegstor frequently can continue to be fed so that continued sewage treatment can be effected while cleaning—a salient advantage.

As the cleaning process initially begins, an unconfined air lift appears, gushing water through and over any scum blanket in the digestor. The scum blanket is forced down and broken up into small particles similar to a sheet of ice going over a waterfall. Sufficient compressed air is forced through the tubes 17 to cause the temperature in the digestor to rise to the optimum range of 90° F. to 100° F. and the volatile acid content to drop below the 1500 to 2000 p.p.m. range. Accumulated grit, undigestible cellulose, and other accumulated residue are driven up from the bottom of the digestor and agitated with the other material in the digestor. The process continues as in normal sludge treatment until the volatile solid reduction has been stabilized to the desired degree and the pH has been elevated to 7.0 or above. At this time, the digestor may be retained in normal day-to-day operation according to the present invention or returned to anaerobic service. To return to anaerobic service, the air piping and other equipment used in the present process are removed, the anaerobic digestion equipment is installed, sludge feed is re-established, and the digestor is re-seeded with "working" anaerobic sludge.

By way of example, a 20 foot digestor with a 15 degree bottom cone was cleaned in the manner described above. A 15 horsepower blower discharging air at 265 cubic feet per minute, 10 p.s.i.g. pressure, and 175° F. over ambient temperature was employed for this purpose.

While certain specific embodiments of the invention have been shown and described herein, it is to be understood that this is merely by way of example and is not to be construed as a limitation. It will be obvious to those skilled in the art that various modifications can be made within the scope of the claims without departing from the spirit of the invention.

What is claimed is:

1. A process for treatment of sludge comprising the steps of: compressing air substantially adiabatically so as to raise the temperature thereof and injecting substantial quantities of said compressed air into the bottom region of a vented, thermal-insulated treatment vessel containing said sludge through one or more heat-conductive tubes submerged in said sludge so as to transfer heat from said compressed air through said heat-conductive tubes to said sludge and controlling the quantity of compressed air so injected so as to maintain a temperature within a range of 70° F. to 140° F. in said sludge and to maintain a finite volatile acid concentration of less than 2000 parts per million in said sludge.

2. A process for treatment of sludge as defined in claim 1 wherein said compressed air is injected in quantities sufficient to suppress anaerobic digestion but insufficient to support aerobic digestion.

3. A process for treatment of sludge as defined in claim 1 wherein said temperature is maintained within a range of 70° F. to 110° F.

4. A process for treatment of sludge as defined in claim 1 wherein said volatile acid concentration is maintained within a range of 300 to 1500 parts per million.

5. A process for treatment of sludge as defined in claim 1 wherein said compressed air is injected at a pressure of approximately 10 to 15 p.s.i.g. and at a rate of approximately 20 to 25 cubic feet per minute per 1000 cubic feet of sludge volume within the treatment vessel.

6. A process for treatment of sludge as defined in claim 1 wherein said air is heated by compression to approximately 150° F. or more over ambient.

7. A process for separate treatment of sludge comprising the steps of: introducing said sludge into a vented, thermal-insulated treatment vessel; compressing air substantially adiabatically so as to raise the temperature thereof; injecting substantial quantities of said compressed air into the bottom region of said treatment vessel through a plurality of heat-conductive tubes so as to transfer heat from said compressed air through said heat-conductive tubes to said sludge, said quantities of compressed air being sufficient to suppress anaerobic digestion but insufficient to support aerobic digestion; controlling the quantity of compressed air so injected so as to maintain a temperature within a range of 70° F. to 110° F. in said sludge and to maintain a volatile acid concentration within a range of 300 to 1500 parts per million in said sludge.

8. A process for separate treatment of sludge as defined in claim 7 wherein said compressed air is injected at a pressure of approximately 10 to 15 p.s.i.g. and at a rate of approximately 20 to 25 cubic feet per minute per 1000 cubic feet of sludge volume within the treatment vessel.

9. A separate sludge digestor comprising: a thermal-insulated treatment vessel having a sludge inlet and a sludge outlet; means venting said treatment vessel to the atmosphere; a plurality of heat-conductive tubes extending downwardly to the bottom region of said treatment vessel, each of said tubes having a plurality of air exit apertures adjacent its bottom end; and a variable-volume, variable-pressure air compressor connected to the top ends of said tubes for substantially adiabatically compressing air and forcing said compressed air through said plurality of heat-conductive tubes and out of said apertures.

10. A separate sludge digestor as defined in claim 9 wherein said means for venting said treatment vessel comprises at least one vent stack mounted atop of said treatment vessel and having a venturi section therein for mixing with atmospheric air at high velocity the vapors and gases expelled from said treatment vessel.

11. A separate sludge digestor as defined in claim 10 wherein said heat-conductive tubes are nested centrally in said treatment vessel.

References Cited

UNITED STATES PATENTS

| | | | |
|---|---|---|---|
| 2,430,519 | 11/1947 | Mallory | 210—6 |
| 2,638,444 | 5/1953 | Kappe | 210—14 X |
| 2,720,489 | 10/1955 | Walker | 210—4 |

OTHER REFERENCES

Buswell, A. M.: "Septic Tank to Controlled Digestion," article appearing in Biological Treatment of Sewage and Industrial Wastes, vol. II, Anaerobic Digestion, etc., edited by McCabe, J. et al., 1958, Reinhold Publishing Co., New York, pp. 5–7 relied on (copy in Group 171).

MICHAEL E. ROGERS, *Primary Examiner.*

MORRIS O. WOLK, *Examiner.*